United States Patent
Mezic

(10) Patent No.: US 10,367,843 B1
(45) Date of Patent: Jul. 30, 2019

(54) SECURING A NETWORK

(71) Applicant: PacketSled, Inc., Santa Barbara, CA (US)

(72) Inventor: Igor Mezic, Santa Barbara, CA (US)

(73) Assignee: PacketSled, Inc., Santa Barbara, CA (US)

( * ) Notice: Subject to any disclaimer, the term of this patent is extended or adjusted under 35 U.S.C. 154(b) by 0 days.

(21) Appl. No.: 16/254,081

(22) Filed: Jan. 22, 2019

Related U.S. Application Data

(60) Provisional application No. 62/757,048, filed on Nov. 7, 2018.

(51) Int. Cl.
| | | |
|---|---|---|
| *H04L 29/06* | (2006.01) | |
| *H04L 12/26* | (2006.01) | |
| *H04L 12/24* | (2006.01) | |
| *G06K 9/62* | (2006.01) | |
| *G06F 17/14* | (2006.01) | |
| *G06N 7/08* | (2006.01) | |
| *H04L 29/08* | (2006.01) | |

(52) U.S. Cl.
CPC ........ *H04L 63/1425* (2013.01); *G06F 17/141* (2013.01); *G06K 9/6269* (2013.01); *G06N 7/08* (2013.01); *H04L 41/142* (2013.01); *H04L 41/16* (2013.01); *H04L 43/045* (2013.01); *H04L 43/062* (2013.01); *H04L 63/1416* (2013.01); *H04L 63/1441* (2013.01); *H04L 67/12* (2013.01)

(58) Field of Classification Search
CPC .................................................. H04L 63/1425
See application file for complete search history.

(56) References Cited

U.S. PATENT DOCUMENTS

| | | | |
|---|---|---|---|
| 2006/0047807 A1* | 3/2006 | Magnaghi ........... | H04L 41/0677 709/224 |
| 2007/0283436 A1* | 12/2007 | Duffield .............. | H04L 63/1425 726/23 |
| 2016/0042287 A1* | 2/2016 | Eldardiry ................ | G06F 21/00 706/14 |
| 2018/0324199 A1* | 11/2018 | Crotinger ............ | H04L 63/1425 |
| 2019/0124099 A1* | 4/2019 | Matselyukh .......... | H04L 41/142 |

OTHER PUBLICATIONS

Zeb et al. Volume Based Anomaly Detection using LRD Analysis of Decomposed Network Traffic Aug. 13-15, 2014 Fourth edition of the International Conference on the Innovative Computing Technology (INTECH 2014) (Year: 2014).*

(Continued)

*Primary Examiner* — David J Pearson
(74) *Attorney, Agent, or Firm* — SoCal IP Law Group LLP; Steven C. Sereboff

(57) ABSTRACT

Methods and systems for visualizing, analyzing, archiving and securing computer and internet of things (IoT) data networks are disclosed. The system includes a data collection device (sensor), preprocessing unit, analysis unit containing at least the Koopman mode analysis unit, and a postprocessing unit. The methods include Koopman mode analysis, support vector machines or deep learning used to compute the baseline, detect and rank known and unknown threats to the system, visualize and archive them.

27 Claims, 6 Drawing Sheets

© 2019 PacketSled

(56) References Cited

OTHER PUBLICATIONS

Xing-jian et al. The Scale Self-Adjusting Multi-Resolution Network Traffic Anomaly Detection Sep. 21-24, 2008 2008 IEEE Conference on Cybernetics and Intelligent Systems (Year: 2008).*

Depren et al., "An intelligent intrusion detection system (IDS) for anomaly and misuse detection in computer networks", Journal, Expert Systems with Applications vol. 29, issue 4, published Nov. 2005, pp. 713-722.

Guo et al., "A two-level hybrid approach for intrusion detection", journal, Neurocomputing vol. 214, published Nov. 19, 2016, pp. 391-400.

Vern Paxson, "Bro: A System for Detecting Network Intruders in Real-Time", journal, published in the Proceedings of the 7th USENIX Security Symposium San Antonio, Texas, Jan. 26-29, 1998, 22 pages.

* cited by examiner

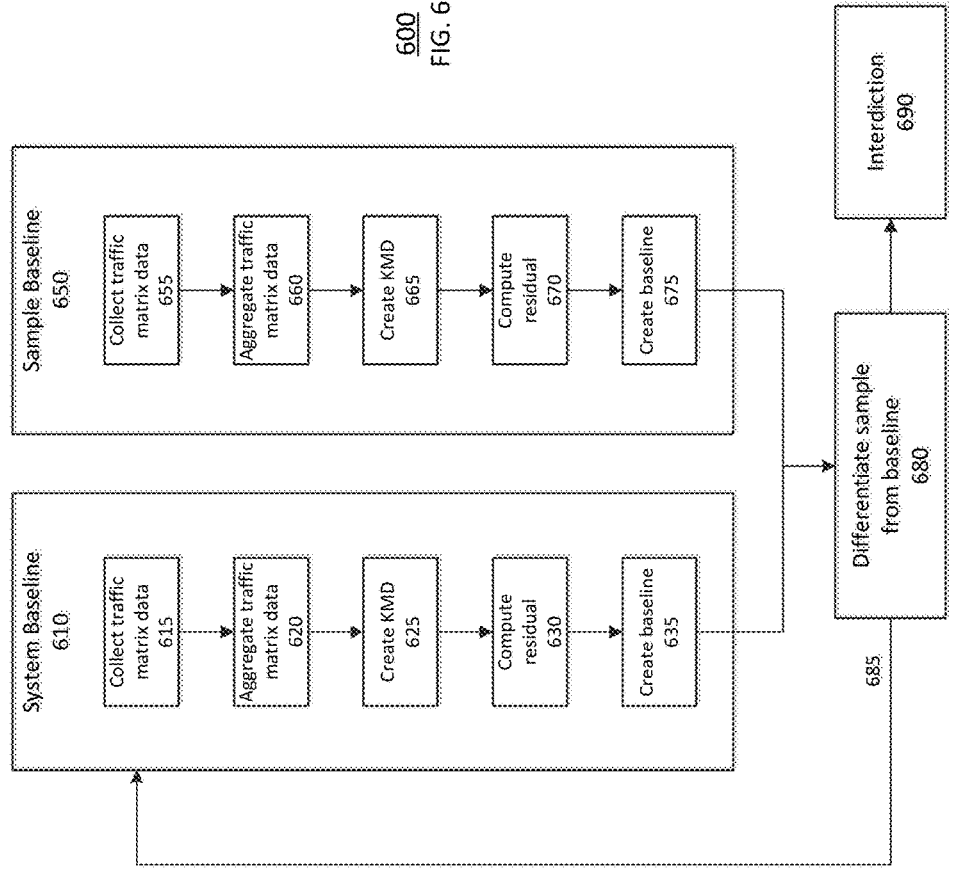

SECURING A NETWORK

RELATED APPLICATION INFORMATION

This patent claims priority from the following provisional patent application which is incorporated herein by reference: Application No. 62/757,048 filed Nov. 7, 2018.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data network security.

Description of the Related Art

The proliferation of computer and device (Internet of Things) networks using a variety of communication protocols has changed the nature of business and communication in revolutionary ways. It also dramatically affected security of data in general, and customer privacy and intellectual property security in particular.

The security threat is rapidly expanding, and network security professionals and corporations are struggling to keep up with the pace of threat innovation. The major underlying problem is the size of the underlying data streams. In order to detect a security threat, a network security threat might need to examine, even on a local network, traffic on $10^{12}$ source-destination pairs.

The nature of current threat-detection techniques can be classified as rule-based, statistics-based and machine learning-based. The literature also classifies intrusion detection by system type as misuse detection and anomaly detection. In misuse detection, the signatures of threats that already occurred are stored in a database, and one of the threat detection techniques is deployed to provide a match or no-match between the network events and signatures of threat events. Misuse detection cannot detect new threats. In anomaly detection, the system uses one of the threat detection techniques by identifying network traffic that significantly deviates from the baseline profile. However, anomaly detection systems are typically relegated to small subsets of data, since the computational effort needed to establish a baseline can be excessive for even a moderate-size network.

DESCRIPTION OF THE DRAWINGS

FIG. 6 is a flowchart for securing a network through baseline comparisons.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Prior work on network traffic analytics neglects the key driving forces in network dynamics: daily, weekly, monthly and seasonal cycles, and behavior (normal and abnormal) of machines and humans. Thus, it does not establish the context in which the network operates and cannot provide accurate information on threats occurring in real time. The consequence of this is that alarm-type systems predominate the prior work and create an overwhelming burden for the system operator instead of providing him/her with ability to visualize, archive and combat threats. The current description mitigates this problem.

Artificial intelligence systems and methods are disclosed for visualizing, analyzing archiving and securing a computer or internet of things (IoT) networks. Systems and methods are disclosed which establish a baseline of a network of at least two computers or devices where at least one of the two is communicating with the other over a communication channel, and perform analysis, visualization, archival procedures and security procedures on the network. Systems and methods are disclosed for updating the baseline of the system to indicate changed behavior due to addition of software or hardware. This disclosure includes systems and methods to perform misuse detection and anomaly detection on the said network by utilizing the established baseline and comparing it with established libraries of normal changes to the system and anomalous changes to the system. Systems and methods are disclosed for human-machine interaction; in particular, communication with an operator enabling action on the information provided with the system and instructing the system on the classification of new security threats. Systems and methods are disclosed for reduction of false misuse and anomaly positives in network security systems.

Figure 1:
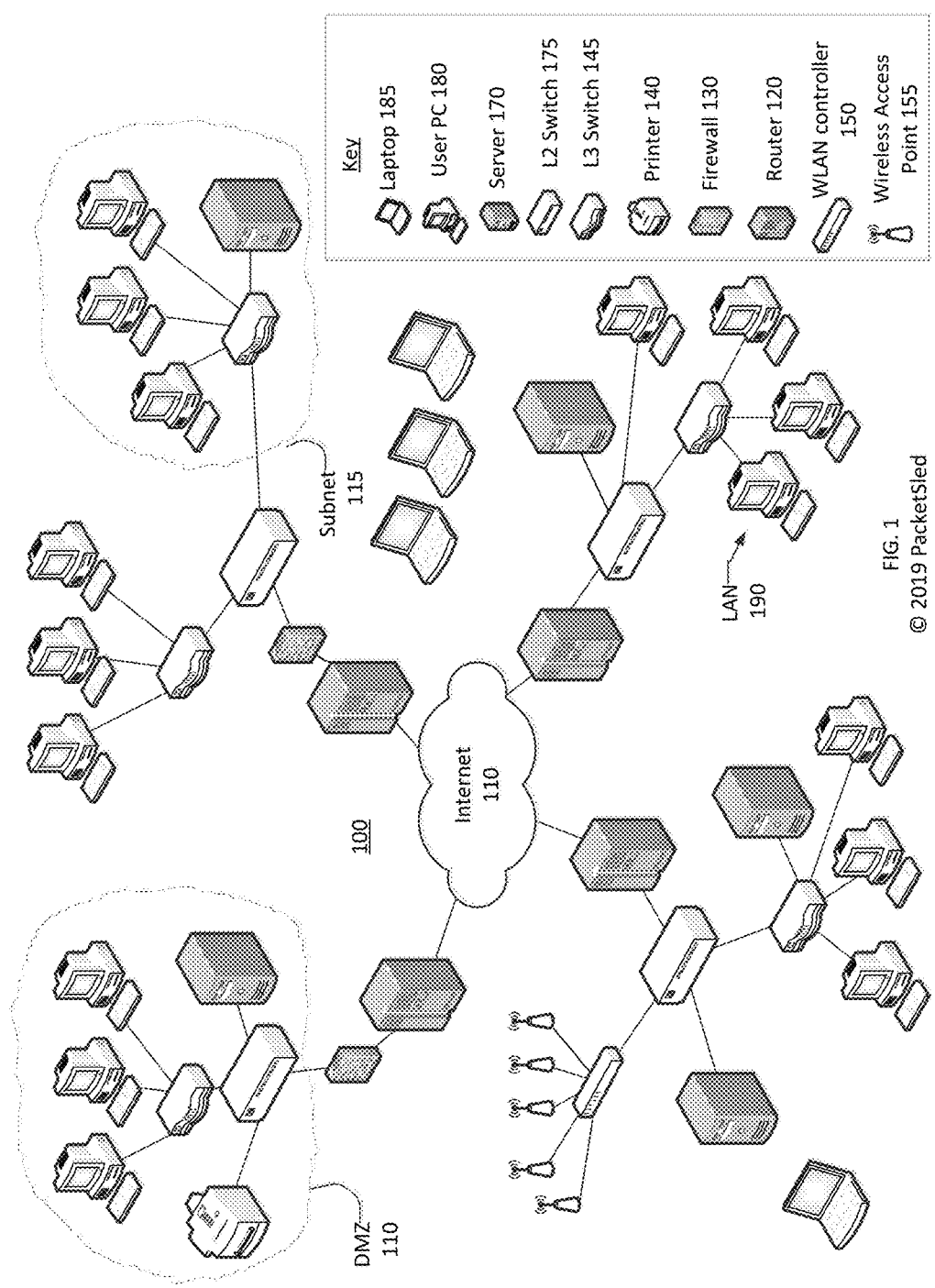
FIG. 1 is a diagram of multiple computers and devices interconnected in a network.

Referring now to FIG. 1 there is shown a diagram of multiple computers and devices interconnected in a network 100. The network 100 is a data or computer communication network that may be or include various LANs, MANs, WANs, wireless LANs or internetworks, such as those shown, or any other network of two or more computers or devices. The network 100 may include user-controlled end point devices such as laptops 185 and user PCs 180, as well as automated end point devices such as servers 170, printers 140, robots (not shown) or sensors (not shown). Automated end point devices may be user-controllable or fully automated. The network may also include various intermediate or interface devices such as layer 2 switches 145, layer 3 switches 175, firewalls 130, routers 120, WLAN controllers 150 and wireless access points 155. The various devices and interconnections of the network 100 may be arranged to include LANs 190, subnets 115 and DMZs 110.

Figure 4:
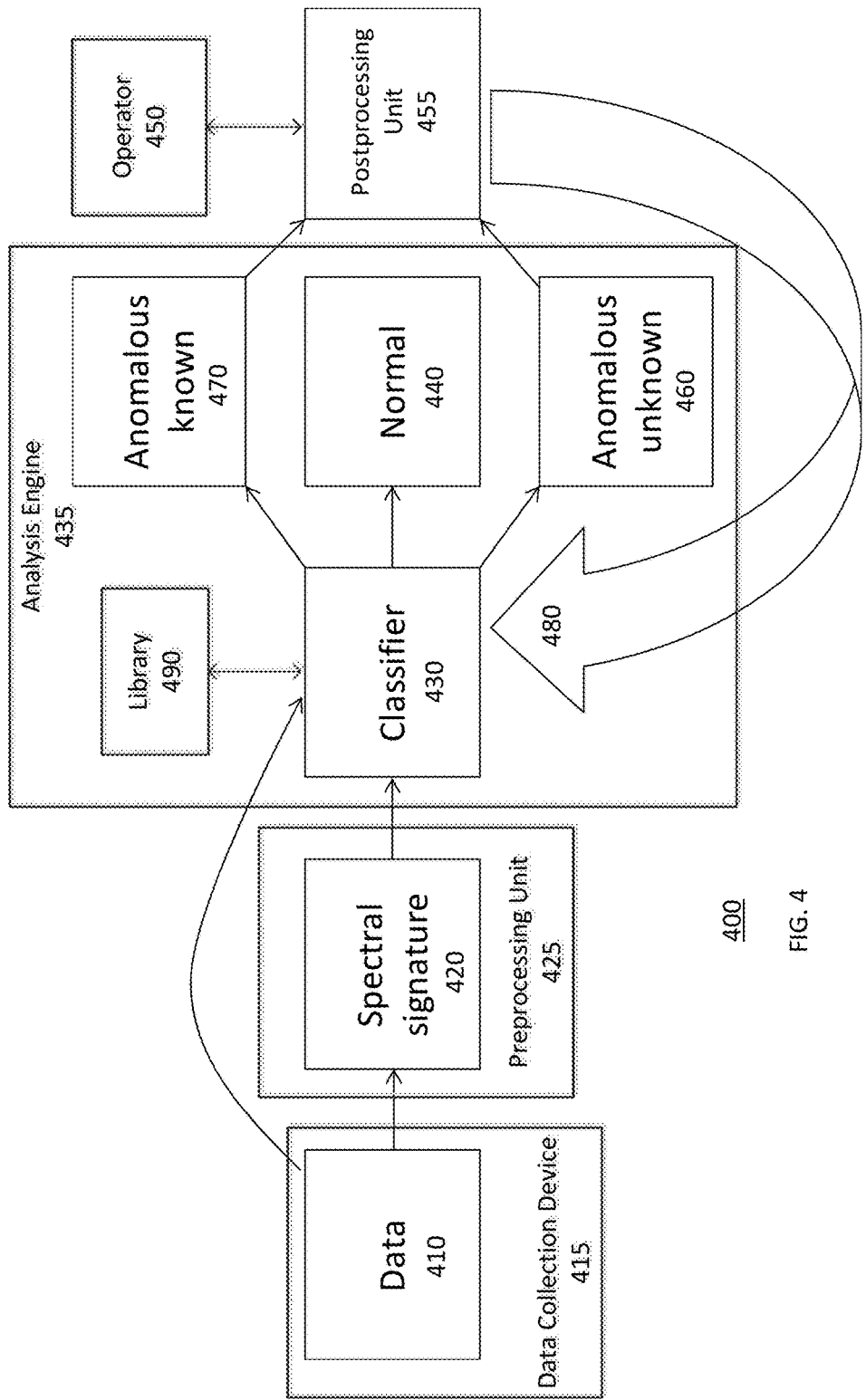
FIG. 4 is a schematic representation of a network security system operation.

Data transmission between two network devices (or nodes) in the system 100 of FIG. 1 may be represented schematically in a system 400 as in FIG. 4. In practice, streams of raw data from numerous connections are collected and processed using the system 400. System 400 may be an artificial intelligence (AI) system.

The system 400 includes a data collection device 415 such as a sensor, data monitor, or other device, a preprocessing unit 425, an analysis engine 435 containing at least a Koopman mode analysis unit, and a postprocessing unit 455.

The base unit of a network as it regards to the Koopman mode decomposition (KMD) analysis is a flow object which describes a data communication connection and its related properties (data source, data destination, communication protocol, etc.). Once the connection is terminated (e.g., the connection is established from data source to destination), flows objects may be recorded into a connection log which may be subsequently saved into a database. The flow objects may each comprise a single alphanumeric value or a set of alphanumeric values mathematically processed from raw data collected from the plurality of sensors over time. The stream of flow objects may consist of a finite dimensional nonlinear system.

The data collection device 415 provides raw data 410 to the preprocessing unit 425. This raw data 410 is network communication data, i.e., data transmitted through the network from a device originating the data to a destination device. The data may be communicated according to a network protocol and/or in packets.

The raw network data 410 is then analyzed by the preprocessing unit 425 using a spectral operator theoretic methodology which transforms the finite dimensional nonlinear system of the stream of flow objects to an infinite linear set. In accordance with the spectral operator theoretic methodology, the stream of flow objects is decomposed. The preprocessing unit 425 computes spectral signatures 420 of the network from observables on the raw data 410. An observable is any single numerical value or set of numerical values obtained from the raw data via mathematical processing. For example, an observable might be the total volume of network communication traffic in a day between a specific source internet protocol (IP) address and a specific destination IP address. Another example of an observable is the number of alarms over a pre-specified period of time. An alarm is a message indicating trouble in a network, such a slow or failing component, or an outage. The preprocessing unit 425 may be a Koopman mode analysis unit. Koopman mode analysis here consists of computing Koopman modes of temporal evolution of observables. In Koopman mode analysis, time domain eigenvalues are transformed into a complex plane showing growth, decay and frequency, along with Koopman modes and eigenfunctions for the time domain eigenvalues. Thus, the preprocessing unit 425 outputs KMD components corresponding to the input flow objects that are at least one of (a) oscillating, (b) exponentially growing, (c) exponentially decaying, (d) mean, and (e) stochastic.

Spectral properties of the signatures 420 of the Koopman mode analytics from the preprocessing unit 425 corresponding to the flow objects may then be used by a classifier 430 in the analysis engine 435 to classify them into a number of categories, such as normal 440, anomalous known 470 or anomalous unknown 460. The normal category is indicative of normal behavior in the corresponding flow objects. The anomalous known category is indicative of anomalous behavior in the corresponding flow objects having a known cause. The anomalous unknown category is indicative of anomalous behavior in the corresponding flow objects having an unknown cause.

The normal behavior may refer to a) the mean, b) the oscillating component, or c) the stochastic component of the signal. For example, it may be that the mean amount of x bytes is exchanged on Monday between two IP addresses. Deviations from that mean indicate the anomaly of the mean. However, the exchange between 9 AM and 6 PM consists normally of y bytes, while the exchange before 9 AM and after 6 PM on that Monday consisted normally of total of z bytes. This is the normal oscillating component in the example. The normal stochastic component has a distribution associated with it. Deviations from the distribution indicate anomaly. The anomaly can be due, among other, to administrative reasons (e.g., addition of a router to the network) or due to an ongoing attack.

The classifier 430 may use a library 490 as a reference for classification and/or categorization. The library 490 may be a database which correlates component values to categories. The classifier 430 may further sort the components into the categories using the library 490. The classifier 430 may compare and correlate component values output by the preprocessing unit 425 to categories stored in the library 490 to perform the classification.

The classification may be utilized by the postprocessing unit 455 for securing the respective network (e.g., network 100) for threat prevention. Network activity associated with normal behavior 440 may be allowed. Network activity associated with anomalous known behavior 470 or anomalous unknown behavior 460 may be interdicted. That is, based upon how the behavior is classified, the system may block or modify any one or more of individual IP activity, individual protocol activity, a subnetwork activity, a full network activity. The action can be performed automatically or in conjunction with the human operator 450. Specifically, the system and/or user can block or modify individual IP activity, individual protocol activity, a subnetwork activity, or a full network activity of network activity associated with anomalous known behavior 470 or anomalous unknown behavior 460.

The categorization provided to the postprocessing unit 455 may be presented to a human operator 450. If the behavior is anomalous and unknown, the human operator 450 can interact with the system 400 and label the behavior, as well as change the classification. In some cases, the operator 450 re-classifies the behavior as anomalous and known; or re-classifies the behavior as normal. The system 400, through the postprocessing unit 455, is additionally enabled for learning via an interface with the human operator 450, where the interaction leads 480 to additional classification of previously unknown threats, and removal of alarms that are recognized as false misuse and/or anomaly positives by the AI system 400. For example, the interaction 480 may update the engine 435 or library 490.

Figure 2:
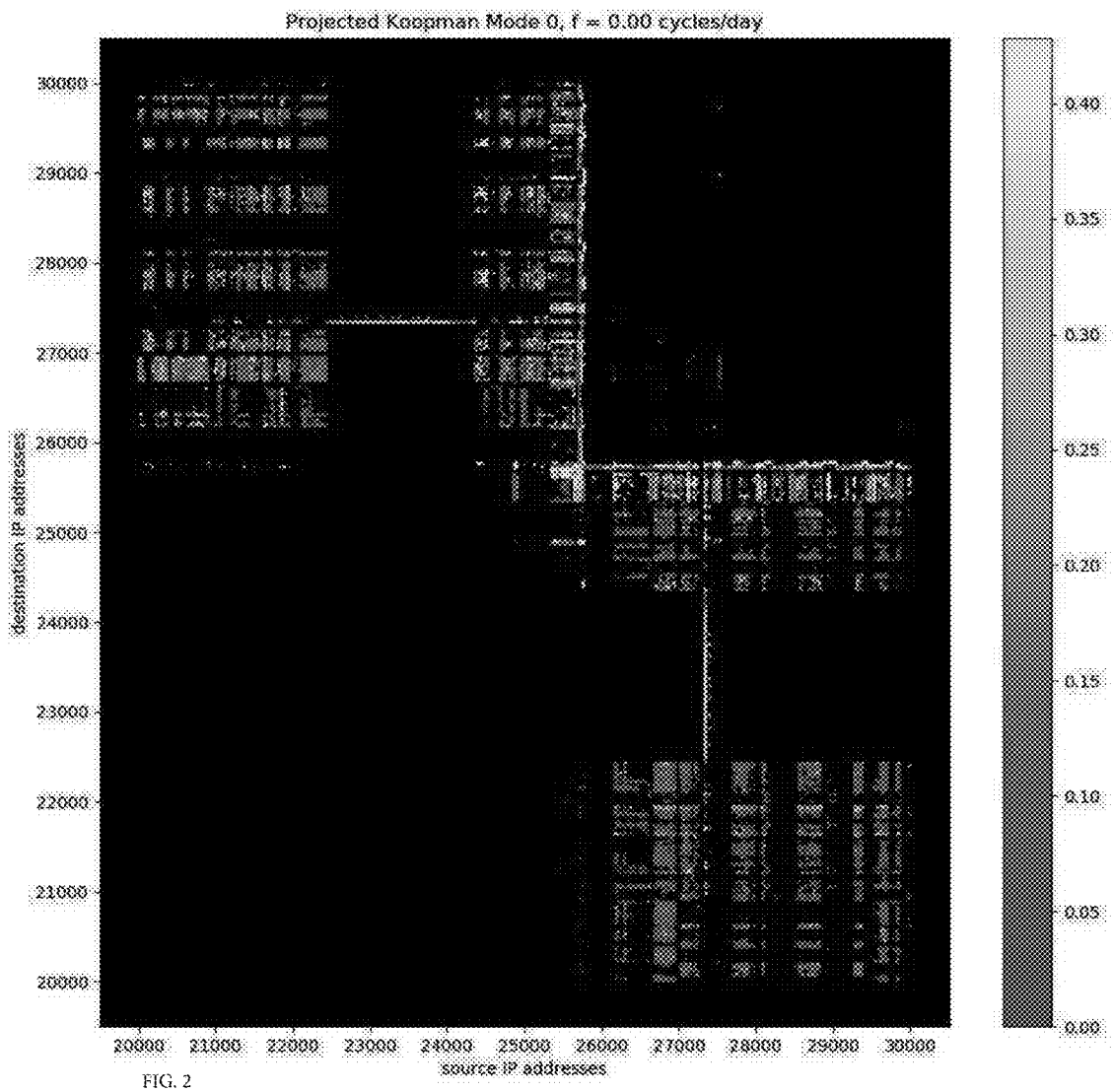
FIG. 2 is a visualization of a network as a graph, using a scalar field over the nodes of the graph whose nodes are source and destination IPs.
Figure 3:
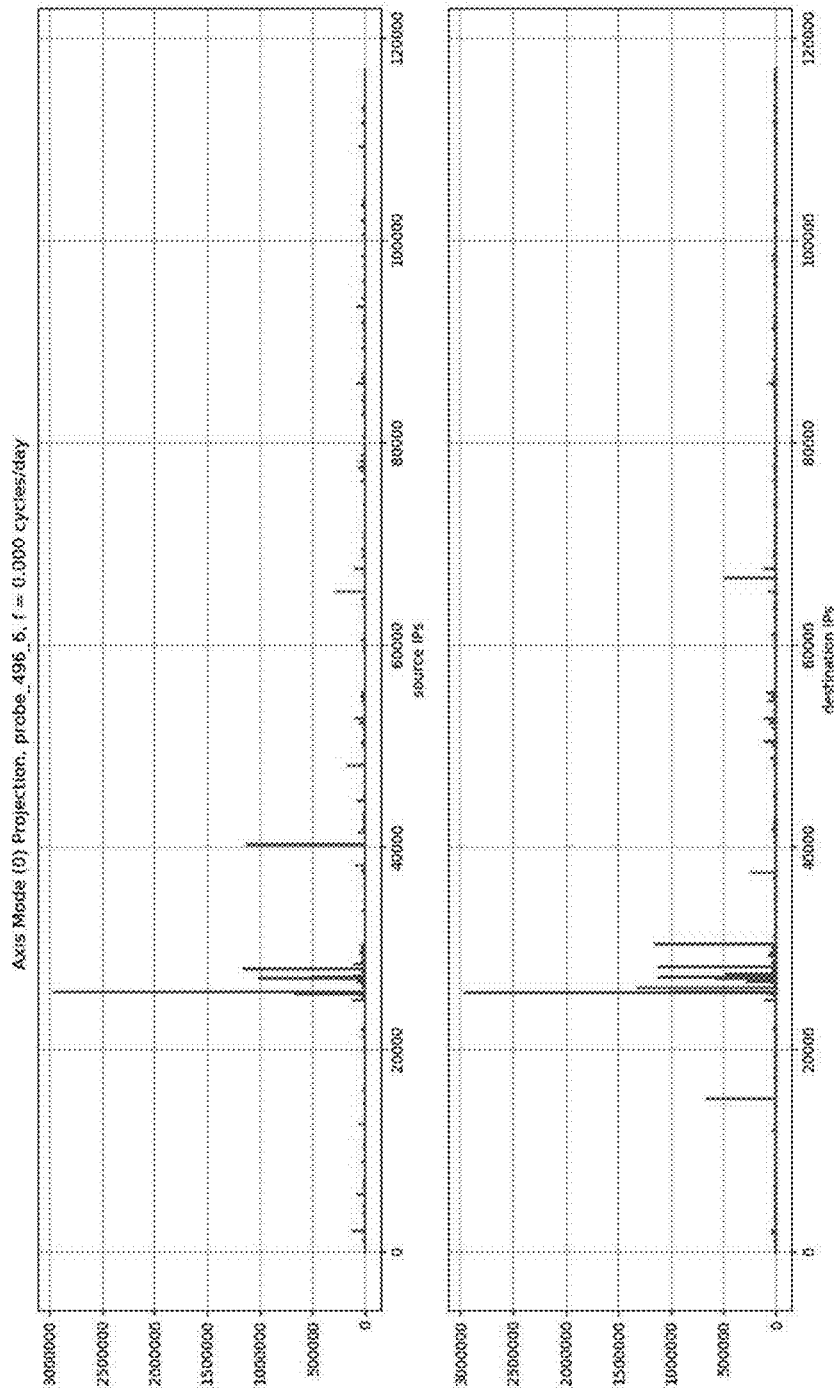
FIG. 3 is a visualization of a network using source and destination traffic graphs.

The operator 450 may be presented with a computer screen visualization which represents the network as a graph and associating scalar or vector values to the nodes and edges of the said graph. The scalar or vector values may then be attributed a color and visualized on a computer screen. A typical scalar value can be the value of the Koopman mode on the edge or the node. An instance of a two dimensional, lattice-type graph and the visualization of the associated mean Koopman mode is shown in FIG. 2. Another instance of visualization, representing mean outgoing Koopman mode and mean incoming Koopman mode of the traffic over a linear graph of IP addresses is shown in FIG. 3. These visualizations depict at least one of the categories, and depict each category differently. The visualization may be overlaid upon a schematic or spatial network plan of the corresponding components such as that shown in FIG. 1. When the operator 450 makes interdictions or changes, the visualization may be dynamically updated to show changes in the network.

One benefit of the process represented by FIG. 4 is a reduction of false positives; and an increase in computer efficiency of identification of misuse and anomaly positives. For example, rather than have human operators consider all anomalies, attention may be limited to unknown anomalies. Furthermore, if a human operator has re-classified an unknown anomaly as normal or known anomalous, this reclassification goes into the library 490, thereby improving future classification and reducing misuse and anomaly false positives.

Classification of new categories of behavior may be stored into the library 490—an archival methodology. In addition, the library 490 may be updated from other sources. Archiving may also comprise selective storing of data, as decided by the analysis engine 435, or the analysis engine 435 in interaction with the human operator 450. The archiving of data can consist, for example, of the baseline only data storage; baseline and anomalous events data storage; or full processed data storage, and full raw data storage for the temporal period where anomalous behavior is detected.

Analysis Methodology

Analysis of network data communication is computationally intensive because of the large number of time events and data points. This issue is addressed by transforming the network dynamics into its Koopman counterpart, and pursuing Koopman mode decomposition (KMD) analysis. KMD analysis is a method of analyzing a temporal data stream by decomposing the data stream into components that are oscillating, exponentially growing or decaying; and those exhibiting behavior consistent with continuous spectrum (i.e., not oscillating, exponentially growing or decaying). The KMD of the data is an operator derived from a transformation which takes a finite dimensional nonlinear system of equations (or data) to an infinite set of linear equations (or data).

There are multiple approaches to calculate the Koopman modes, such as using harmonic averages of the spatial field, or by using the Arnoldi algorithm. In particular, the harmonic average of linear dynamics (or periodic data), can be obtained by calculating the Fourier series. Here, harmonic averaging of the finite dimensional nonlinear system may be achieved by calculating a Fourier series of the finite dimensional nonlinear system. There are many efficient Fourier transform (FFT) methods available for this purpose. On the other hand, other computational methods may be used. Accordingly, the stream of flow objects may be decomposed using a dynamic mode decomposition type algorithm on the finite dimensional nonlinear system. The stream of flow objects may be decomposed by Laplace averaging the finite dimensional nonlinear system. Assuming that the dynamics or data are linear (but infinite in dimension), a Krylov sequence and associated Krylov matrix can be generated. The Koopman modes are then extracted from this Krylov matrix using one of many algorithms including the Arnoldi method.

Support Vector Machine and Deep Learning Methodology

Deep learning may be utilized by system 400 such as to update or train any of device 415, unit 425, engine 435 and/or unit 455. This deep learning may use deep recurrent neural networks (RNNs); and/or support vector machines, to find representations of network data such as data 410 or preprocessed data from unit 425. Recurrent models repeatedly apply a transformation to elements of a sequence of inputs, thereby producing a sequence of outputs. Most RNN architectures, including long short-term memory (LSTM) networks and gated recurrent units (GRUs) share a common computational building block, described by the following equation:

$$\vec{h}_{t+1} = \phi(W\vec{x}_t + U\vec{h}_t + \vec{b}),$$

where $\vec{x}_t \in \mathbb{R}^n$ and $\vec{h}_t \in \mathbb{R}^m$, represent observation and the hidden state at time t; W and U are observation-to-state and state-to-state transition matrices; and b is a bias vector. To produce the next hidden state, this computational building block additively combines information from the current observation and the current hidden state h, followed by an element-wise nonlinear function f (e.g., sigmoid, hyperbolic tangent function or radial basis function—e.g., Gaussian, commonly used in Support Vector Machine framework).

The deep learning or operator theoretic analysis provides the context, in the form of baseline and change of baseline, for the artificial intelligence (AI) system 400, and enables its interaction with human operators. This comparison of baselines is now discussed further with respect to FIG. 6. FIG. 6 is a flowchart 600 for securing a network 100 through baseline comparisons. In some cases, the process of the flowchart 600 can also be used to update or train system 400. The flowchart 600 includes first creating a system baseline 610 and later creating a sample baseline 650.

Creating the system baseline 610 includes collecting a plurality of traffic matrix data over a period of time 615. This may include device 415 collecting data 410. Next, the plurality of traffic matrix data is aggregated over a specified time interval 620. This may include unit 425 processing data 410 to create spectral signatures 420. Next a Koopman mode representation of the first aggregated data is created 625. This may include engine 435 classifying signatures 420 to create categories 440, 460 and 470. Next, a residual is computed by comparing the first Koopman mode representation and the aggregated data 630. Next, the system baseline is created out of first Koopman mode representation and the residual 635, includes categorization as described above.

The same process is used to create the sample baseline 650: collect traffic matrix data over a time period 655; aggregate the traffic matrix data 660; create the KMD of the aggregated data 665; compute the residual 670; and create the baselines out of KMD and the residual 675.

The flow 600 may involve the KMD analysis of network traffic formatted in such a way involves extracting the necessary data from the database (e.g., baselines at 635 and 675), formatting it correctly for the analysis calculation, running the data through KMD algorithms and reasoning about their outputs (e.g., at 680, 685 and 690). The input module of the system (e.g., the data collection device 415) pulls connection data or other data from the database (e.g., JSON files) regarding the timestamps of the available connections (for the required time window) and constructs a time matrix for the window. A time matrix contains, for example, the amount of traffic between each source-destination pair (each member of a pair defined by an IP address and the protocol used for the connection) at each arbitrarily set time step of the time window. This format is suitable as input for the provided KMD algorithms. The in-situ analysis then uses this matrix for the KMD analysis which produces Koopman eigenvalues and eigenvectors.

It is possible that a connection flow can last beyond the scope of the observed window. The data for these kinds of connections may be truncated for the observed time window and the raw (e.g., JSON formatted data) may be saved, e.g., to an external "pickup file" into a database. When a new time window is processed, the contents of this pickup file may be added to the traffic matrix generation procedure which then correctly parses the data as if the connection is fully active during the observation.

The sample baseline can then be tested against the system baseline to detect abnormal behavior in the network 680.

Based on the difference between the system baseline and the sample baseline, the system baseline may be updated 685. To differentiate the baselines, a comparison is made between how traffic matrix data is categorized between the two. As explained above, these differences may be used in a feedback loop into the system baseline 610.

Based upon categorization and differentiation, network data traffic may be interdicted 690 as discussed above.

The traffic matrices themselves, for each window, may also be saved in order to be available for the procedure of amending of the baseline at particular (longer) time intervals. Due to the network data being very large, some physical limits might be reached when processing connection data for establishing of baselines. A separate branch of the system may be delegated to creating a Koopman framework for analysis. Previously saved traffic matrices for the required baseline time interval may be processed so as to extract all communicating connection pairs (in that time interval). From this information, a mapping based on source/destination IPs may be created for further referencing. This map may be saved to the baseline database. Additionally, the total traffic in the network during the processed interval is saved as well (this is basically the sum of the traffic matrices) at the previously defined time step resolution. This data is then used to conduct an FFT analysis of the total traffic to establish significant periodicities in the signal. The frequencies of the significant modes are then used to compute projections of the Koopman modes which are used to calculate the modal noise of the system. Deviation of the in-situ observed data from the statistical baseline established via the above procedure gives a normality estimate for the behavior of the network.

Figure 5:
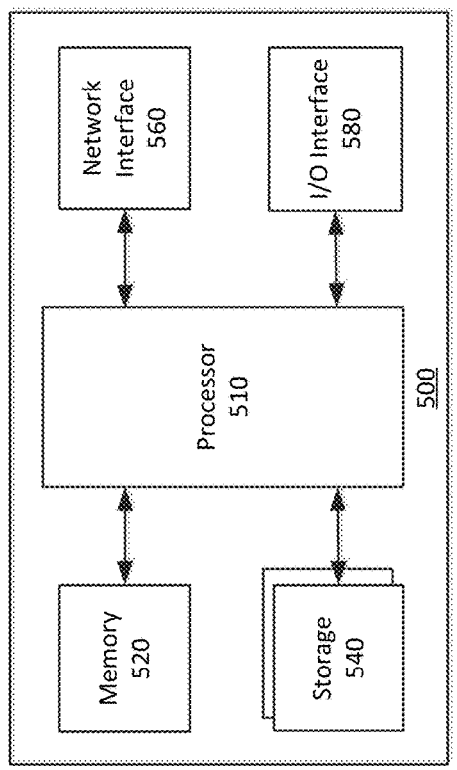
FIG. 5 is a block diagram of a computing device.

Referring now to FIG. 5, there is shown a computing device 500. The computing device 500 may be a node, such as a laptop 185, a user PC 180, a server 170 or a printer 140 (FIG. 1). The computing device 500 may be a network interface device such as a layer 2 switch 175, a layer 3 switch 145, a firewall 130, a router 120, a WLAN controller 150, or a wireless access point 155. The computing device 500 may be or include system 400. The computing device 500 may be for performing the process of flow diagram 600. A computing device as used herein refers to an electronic device with a processor, memory and a non-volatile machine readable storage medium that may execute instructions including, but not limited to, personal computers and server computers. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. For example, a global positioning system (GPS) receiver or similar hardware may provide location-based services.

The computing device 500 has a processor 510 coupled to a memory 520, non-volatile machine-readable medium 540, a network interface 560 and an I/O interface 580. The processor 510 and the memory 520 comprise circuits and software for performing the instructions on the non-volatile machine-readable medium 540.

The processor 510 may be or include one or more microprocessors, field programmable gate arrays (FPGAs), application specific integrated circuits (ASICs), programmable logic devices (PLDs) and programmable logic arrays (PLAs).

The non-volatile machine readable storage medium 540 may be a storage device included with or otherwise coupled or attached to the data processing system 500. That is, the software may be stored in electronic, machine readable media. These storage media include, for example, magnetic media such as hard disks and solid state electronic memory. As used herein, a storage device is a device that allows for reading and/or writing to a storage medium. The non-volatile machine-readable medium 540 provides non-volatile, bulk or long-term storage of data or instructions in the computing device 500. Multiple storage devices may be provided or available to the computing device 500. Some of these storage devices may be external to the computing device 500, such as network storage or cloud-based storage. In some cases, such as those involving solid state memory devices, the memory 520 and storage 540 may be unitary.

The memory 520 may be or include RAM, ROM, DRAM, SRAM and MRAM, and may include firmware, such as static data or fixed instructions, BIOS, system functions, configuration data, and other routines used during the operation of the computing device 500 and processor 510. The memory 520 also provides a storage area for data and instructions associated with applications and data handled by the processor 510. As used herein the term memory corresponds to the memory 520 and explicitly excludes signals or waveforms.

The network interface 560 includes an interface to a network such as a network that can be used to communicate calls, signals, streams, arrays, flagged samples and feedback described herein. The network interface 560 may be wired (e.g., electronic or optical) or wireless.

The I/O interface 580 interfaces the processor 510 to peripherals (not shown) such as displays, video and still cameras, microphones, user input devices such as keyboards and USB devices.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An apparatus comprising a non-volatile machine-readable medium storing a program having instructions which when executed by a processor will cause the processor to enhance security of a data network, the instructions of the program for:
   decomposing a stream of flow objects from a plurality of sensors coupled to the data network into components that are at least one of (a) oscillating, (b) exponentially growing, (c) exponentially decaying, (d) mean, and (e) stochastic;
   sorting the components into categories including at least normal, anomalous known and anomalous unknown, wherein the normal category is indicative of normal behavior in the corresponding flow objects, the anomalous known category is indicative of anomalous behavior in the corresponding flow objects having a known cause, and the anomalous unknown category is indicative of anomalous behavior in the corresponding flow objects having an unknown cause; and
   allowing network activity associated with normal behavior, and interdicting network activity associated with anomalous known behavior or anomalous unknown behavior;
   wherein the flow objects each comprises a single alphanumeric value or a set of alphanumeric values mathematically processed from raw data collected from the plurality of sensors over time;
   wherein the stream of flow objects consists of a finite dimensional nonlinear system;
   wherein decomposing the stream of flow objects comprises transforming the finite dimensional nonlinear system to an infinite linear set.

2. The apparatus of claim 1 wherein sorting comprises comparing the components to a library which correlates component values to categories.

3. The apparatus of claim 2 wherein after sorting, adding to the library at least some of the sorted components.

4. The apparatus of claim 1 wherein after generating the visualization, receiving human operator input indicative that an indicated component which is anomalous unknown should be in an indicated different category, and modifying the category of the indicated component to the indicated category.

5. The apparatus of claim 1 wherein decomposing the stream of flow objects comprises Laplace averaging of the finite dimensional nonlinear system.

6. The apparatus of claim 5 wherein harmonic averaging of the finite dimensional nonlinear system comprises calculating a Fourier series of the finite dimensional nonlinear system.

7. The apparatus of claim 1 wherein decomposing the stream of flow objects comprises using an Arnoldi algorithm on the finite dimensional nonlinear system.

8. The apparatus of claim 1 wherein decomposing the stream of flow objects comprises using a dynamic mode decomposition type algorithm on the finite dimensional nonlinear system.

9. The apparatus of claim 1 further comprising generating a visualization depicting at least one of the categories, the visualization depicting each category differently, the visualization comprising an overlay upon a spatial network plan of the corresponding components.

10. The apparatus of claim 1 wherein interdicting network activity comprises at least one of blocking or modifying individual IP activity, blocking or modifying individual protocol activity, blocking or modifying a subnetwork activity, or blocking or modifying a full network activity.

11. The apparatus of claim 1 further comprising a user input device, a display device, the processor, a memory, wherein the processor and the memory comprise circuits and software for performing the instructions on the non-volatile machine-readable medium.

12. A system for processing network data that consists of at least two devices where at least one of the devices is sending data over a physical or wireless connection to the other, the system comprising:
   a data collection device for collecting a stream of flow objects from a plurality of sensors coupled to the data network, wherein the stream of flow objects consists of a finite dimensional nonlinear system;
   a preprocessing unit containing at least a Koopman mode analysis unit for decomposing the stream of flow objects into components that are at least one of (a) oscillating, (b) exponentially growing, (c) exponentially decaying, (d) mean, and (e) stochastic, wherein decomposing the stream of flow objects comprises transforming the finite dimensional nonlinear system to an infinite linear set;
   an analysis unit for sorting the components into categories including normal, anomalous known and anomalous unknown, wherein the normal category is indicative of normal behavior in the corresponding flow objects, the anomalous known category is indicative of anomalous behavior in the corresponding flow objects having a known cause, and the anomalous unknown category is indicative of anomalous behavior in the corresponding flow objects having an unknown cause; and
   a postprocessing unit for allowing network activity associated with normal behavior, and interdicting network activity associated with anomalous known behavior or anomalous unknown behavior.

13. The system of claim 12, wherein the analysis unit includes a library which correlates the component values to the categories.

14. The system of claim 13 wherein at least some of the sorted components are added to the library after sorting.

15. The system of claim 12 the analysis unit for re-classifying an indicated component responsive to human operator input indicative that the indicated component which is anomalous unknown should be in an indicated different category.

16. The system of claim 12 wherein the Koopman mode analysis unit uses Laplace averaging of the finite dimensional nonlinear system.

17. The system of claim 12 wherein the Koopman mode analysis unit employs harmonic averaging of the finite dimensional nonlinear system.

18. The system of claim 17 where the Koopman mode analysis unit calculates a Fourier series of the finite dimensional nonlinear system.

19. The system of claim 12 wherein the Koopman mode analysis unit decomposes the stream of flow objects comprises using an Arnoldi algorithm on the finite dimensional nonlinear system.

20. The apparatus system of claim 12 wherein the Koopman mode analysis unit decomposes the stream of flow objects comprises using a dynamic mode decomposition type algorithm on the finite dimensional nonlinear system.

21. The system of claim 12 wherein interdicting network activity comprises at least one of blocking or modifying individual IP activity, blocking or modifying individual protocol activity, blocking or modifying a subnetwork activity, or blocking or modifying a full network activity.

22. The system of claim 12 further comprising a user input device, a display device, a processor, a memory, wherein the processor and the memory comprise circuits and software of the data collection device for the data collection device, the preprocessing unit, the analysis unit, and the postprocessing unit.

23. A method of securing a data network using a programmed data processing apparatus, the programmed data processing apparatus comprising a processor and memory, the method comprising the processor performing steps according to a program including:
creating a system baseline comprising:
collecting a first plurality of traffic matrix data over a first time period;
aggregating the first plurality of traffic matrix data over a specified time interval into first aggregated data;
creating a first Koopman mode representation of the first aggregated data;
computing a first residual by comparing the first Koopman mode representation and the first aggregated data;
creating the system baseline out of the first Koopman mode representation and the first residual, wherein the system baseline categorizes each of the traffic matrix data of the first plurality of traffic matrix data as one of normal, anomalous known or anomalous unknown;
creating a sample baseline comprising:
collecting a second plurality of traffic matrix data over a second time period;
aggregating the second plurality of traffic matrix data over a specified time interval into second aggregated data;
creating a second Koopman mode representation of the second aggregated data;
computing a second residual by comparing the second Koopman mode representation and the second aggregated data;
creating a second data representation out of the second Koopman mode representation and the second residual, wherein the sample baseline categorizes each of the traffic matrix data of the second plurality of traffic matrix data as one of normal, anomalous known or anomalous unknown;
computing a difference of the sample baseline and the system baseline;
based on the difference between the system baseline and the sample baseline, updating the system baseline; and
allowing network activity associated with normal behavior, and interdicting network activity associated with anomalous known behavior or anomalous unknown behavior.

24. The method of claim 23 wherein sorting comprises comparing the components to a library which correlates component values to categories.

25. The method of claim 23 wherein decomposing the stream of flow objects comprises using an Arnoldi algorithm on the finite dimensional nonlinear system.

26. The method of claim 23 wherein decomposing the stream of flow objects comprises using a dynamic mode decomposition type algorithm on the finite dimensional nonlinear system.

27. The method of claim 23 wherein interdicting network activity comprises at least one of blocking or modifying individual IP activity, blocking or modifying individual protocol activity, blocking or modifying a subnetwork activity, or blocking or modifying a full network activity.

* * * * *